U S006285565B1

(12) United States Patent
Åberg et al.

(10) Patent No.: US 6,285,565 B1
(45) Date of Patent: Sep. 4, 2001

(54) CABLE SUPPORT APPARATUS

(75) Inventors: Göran Åberg, Saltsjö-Boo; Thomas Ivarsson, Hägersten, both of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/326,765

(22) Filed: Jun. 4, 1999

(51) Int. Cl.⁷ .................. H02B 1/01; H05K 7/02
(52) U.S. Cl. .................. 361/826; 361/825; 174/64; 206/702; 248/220.21
(58) Field of Search .................. 361/752, 803, 361/825–827; 24/548, 563; 206/702; 248/220.21, 222.11, 222.13; 174/60, 64

(56) References Cited

U.S. PATENT DOCUMENTS 5,023,404 * 6/1991 Hudson et al. .................. 174/97
5,168,999 * 12/1992 Lee et al. .................. 206/420
5,307,243 * 4/1994 Sharp et al. .................. 361/826
5,448,015 * 9/1995 Jamet et al. .................. 174/68.3

FOREIGN PATENT DOCUMENTS 94 12 724 7 * 10/1994 (DE) .

* cited by examiner

*Primary Examiner*—Jayprakash N. Gandhi
(74) *Attorney, Agent, or Firm*—Burns, Doane, Swecker & Mathis, L.L.P.

(57) ABSTRACT

A cable support is used in a structure for accommodating electronic equipment, for example printed circuit boards in a subrack. The support includes an elongated rail with cable guiding surfaces for guiding a cable rail with cable guiding surfaces for guiding a cable along the structure. At least one pair of curved fingers are arranged with mutual intervals at an angle to the longitudinal axis of said rail. A tongue is located in the interval between tow adjacent fingers.

10 Claims, 3 Drawing Sheets

CABLE SUPPORT APPARATUS

BACKGROUND

The present invention relates to a cable support for use in a structure for accommodating electronic equipment, for example printed circuit boards in a subrack, said support comprising an elongate rail with cable guiding surfaces for guiding a cable along said structure, and at least one pair of equipment operators fingers arranged with mutual interval at an angle to the longitudinal axis of said rail.

Printed circuit boards are often housed in subracks that are mounted in a larger support frame, e.g. a rack or a cabinet. Cable runways are used in the rack or cabinet to support cables connecting these circuit boards. Additional mechanical support must be provided for the cables between the rack cable runway and the point of connection at the front of the circuit board. These cables can be sensitive to sharp bending which means that the mechanical support also shall enable the use of a large bending radius.

Prior art solutions include the use of cable supports with guiding fingers for allowing correct positioning of each cable in the horizontal plane, in line with the circuit board to which it is going to be connected. However, using these fingers only for horizontal alignment with the circuit board, means that the cable is easily bent also outside the support, i.e. in practice, the exit opening between two fingers allows the cable to pivot in any direction. Also, a cover is often used over this type of support, which makes it more space consuming and makes installation work more difficult.

Another solution is to use cable straps for strapping cables together without any additional mechanical support, or to any convenient nearby support member. In this manner the quality of the installation of cables depends upon the skillfulness of equipment operators and also upon the available time for this work. The resulting cable bundle will often be visible.

Thus, a cable support is needed at the subrack which provides room for a number of cables and also allows fixing of individual cables. It would be advantageous to have a compact cable support that does not consume so much space, especially in case of it being used by few or no cables. Preferably, the cable support allows easy and quick installation to facilitate the work of equipment operators.

SUMMARY

What is needed is therefore a cable support that eliminates the above described problems. The cable support according to the invention is characterized in that a tongue is located in the interval between two adjacent fingers.

In a particular embodiment of the cable support, the tongue is provided with a retaining means for cooperation with a cable strap. This retaining means may form a bar for the cable strap at the end of the tongue.

According to a preferable embodiment of the invention, the retaining means is formed by transverse protrusions at the end of the tongue.

The rail may be provided with an L-shaped cross section and the fingers may be transverse to the longitudinal direction of the rail. The fingers may also be provided with tips that are bent away from the longitudinal axis of the fingers.

Preferably, the L-shaped rail is complemented by the fingers and the tongues to form an U-shaped cable channel. The bottom of the U-shaped profile channel, along the line of fingers and tongues, may be bent slightly in the direction of the opening of the U-shaped profile.

The rail may be adapted to cooperate with an edge portion of a subrack to form a substantially closed section cable cannel.

BRIEF DESCRIPTION OF THE DRAWINGS

The invention will in the following be further described in a non-limiting way under reference to the accompanying drawings in which.

DETAILED DESCRIPTION

Figure 1:
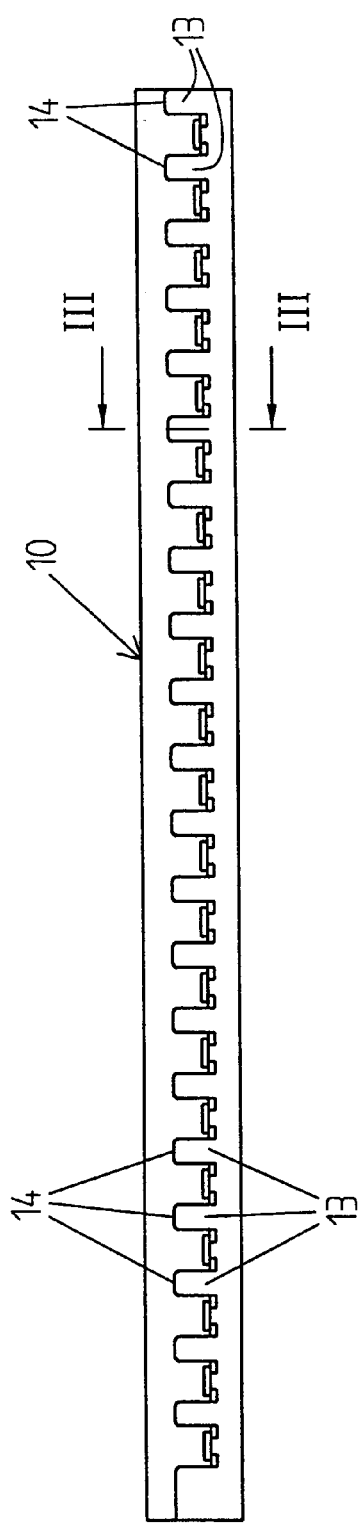
FIG. 1 is a front view of a cable support rail according to a first embodiment of the invention.
Figure 2:
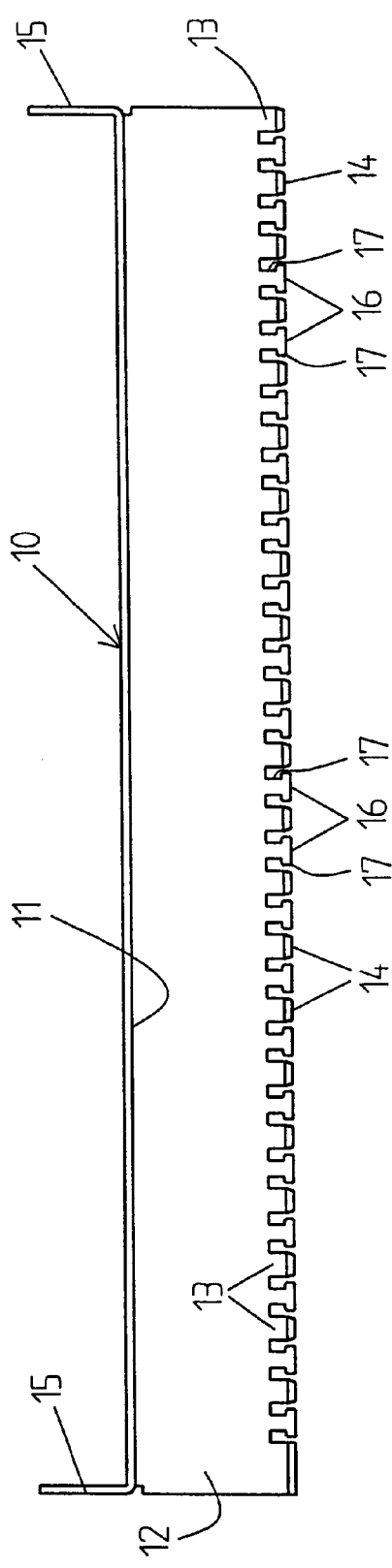
FIG. 2 is a similar view from above.
Figure 3:
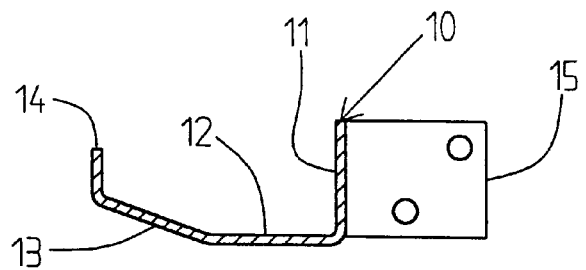
FIG. 3 is a section along line III—III in FIG. 1.

FIGS. 1–3 show the cable support rail 10 according to a first embodiment of the invention. The rail 10 forms an elongate U-channel with a back side wall 11, a bottom wall 12 and an opposite curved side comprising fingers 13 with tips 14. Both rail ends are provided with mounting ears 15 for attachment to a subrack.

The fingers 13 are positioned with equal intervals along the rail side and a tongue 16 with retainers 17 is located in each of the intervals. The retainers 17 comprise transverse protrusions at the outer end of the tongue.

Figure 4:
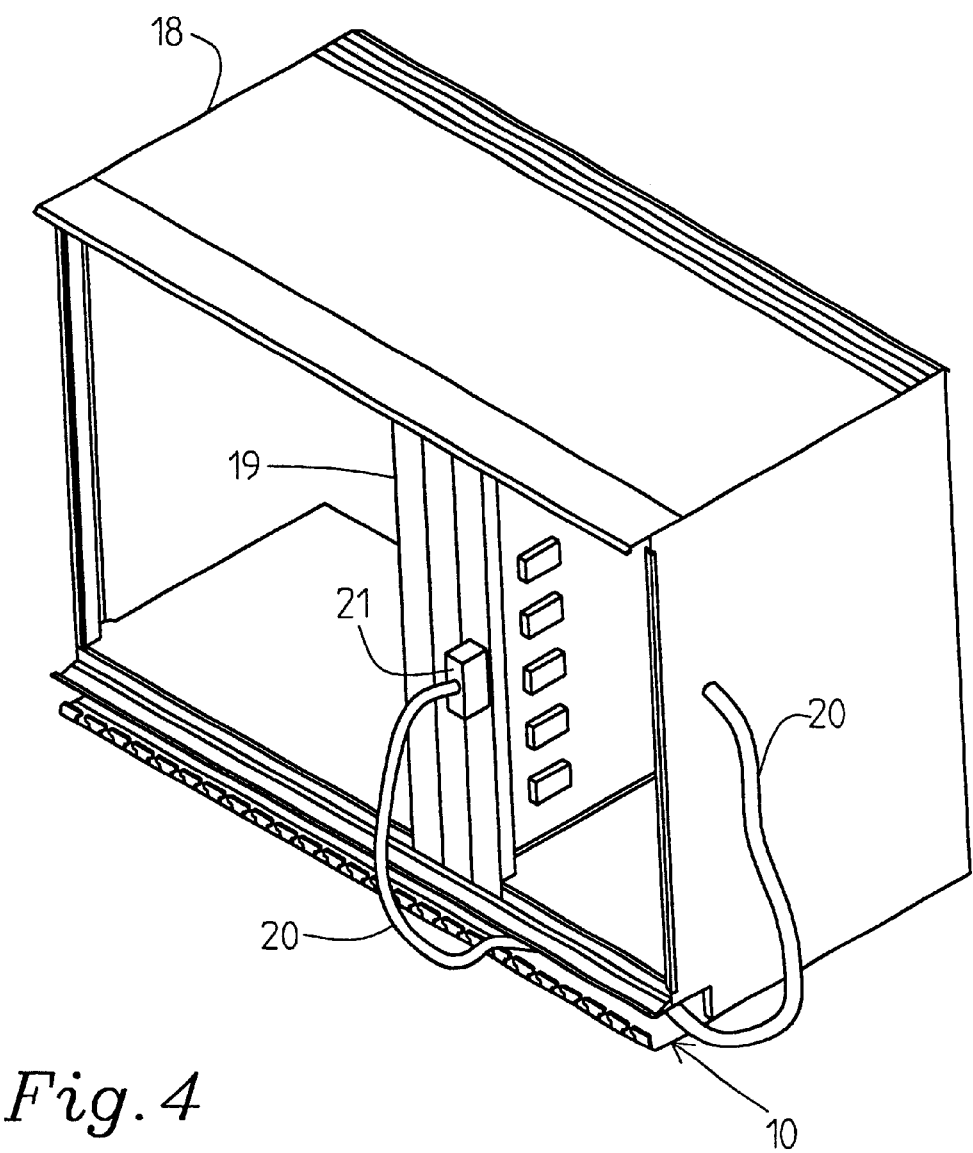
FIG. 4 is a perspective view of a subrack which is provided with a cable support rail according to a second embodiment of the invention.

FIG. 4 shows a cable support rail according to a second embodiment of the invention, mounted horizontally at the bottom of a subrack 18. A printed circuit board 19 is vertically mounted inside the subrack 18 and a cable 20 is connected to the board 19 via a connector 21.

Figure 5:
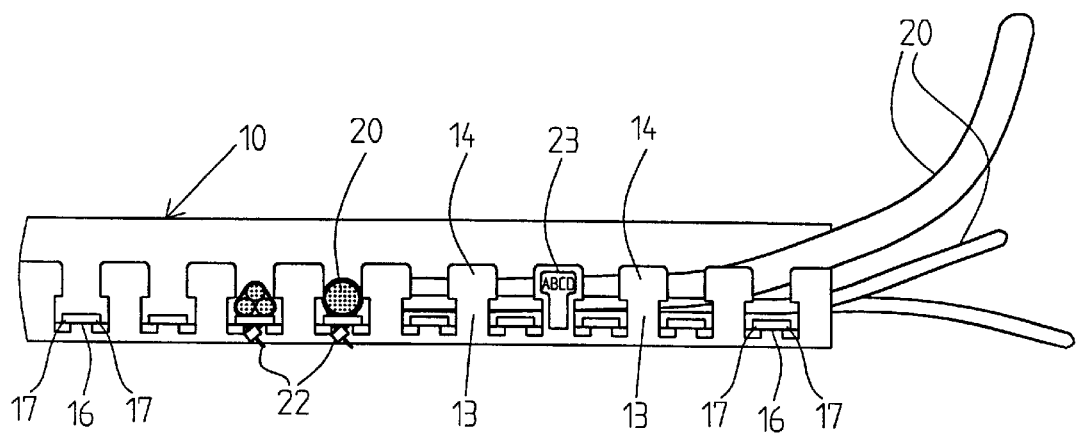
FIG. 5 is a front view of the rail in FIG. 4, with four installed cables.

FIG. 5 illustrates the use of nylon cable straps 22 for securing the cables 20 to the tongues 16 between the fingers 13, 14. It is possible to form the cable strap loop around the cable, in front of the cable support rail 10, and then push the loop between the two adjacent fingers 13, 14 until the loop is seated behind the two tongue protrusions 17. Now the cable strap may be tightened until the loop presses the cable against the tongue which is slightly angled up in the direction of the circuit board. This process takes very little time, and the result of the process is that the cable positively guided in the direction of the circuit board.

Figure 6:
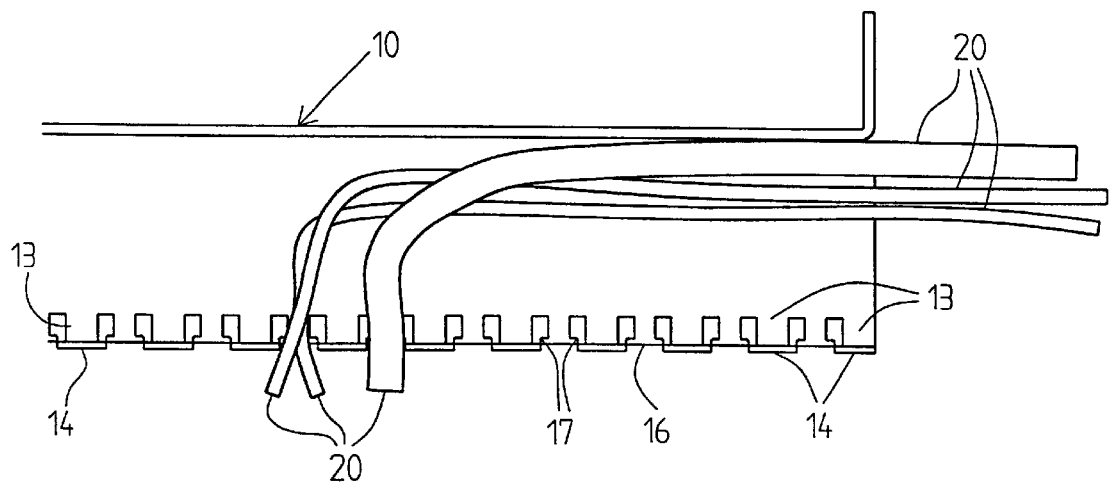
FIG. 6 is a similar view from above.

FIG. 6 shows cables 20 before being strapped. The fingers hide the cables in the support and hold them temporarily before strapping or during temporary configurations. Even if the cables have not been secured to the tongues, they are being prevented from falling out of the cable support rail by the fingers 13, 14.

The major difference between the embodiments of the rail according to FIGS. 1–3 and FIGS. 4–6, is that the tips 14 of the fingers 13 are wider in the embodiment according to FIGS. 4–6. The finger tip face may be used for attaching a marking label 23 as shown in FIG. 5, e.g. for marking of PBA slot numbers etc.

The invention is not limited to the above described embodiments, instead several modifications are possible within the scope of the accompanying claims. For example, the rail may have a different profile. The fingers may be different and other types of retainers may be used on the tongue instead of the two protrusions 17, e.g. a single
} protrusion may be used which is bent in the opposite direction to the finger tips 14.

What is claimed is:

1. A cable support for use in a structure for accommodating electronic equipment said support comprising an elongate rail with cable guiding surfaces for guiding a cable along said structure, at least one pair of curved fingers arranged with mutual interval at an angle to the longitudinal axis of said rail, and a tongue which is located in the intervals between two adjacent fingers, wherein the tongue is provided with a retaining means for cooperation with a cable strap.

2. A cable support according to claim 1, wherein the retaining means forms a bar for said cable strap at the end of the tongue.

3. A cable support according to claim 1, wherein the retaining means is formed by transverse protrusions at the end of the tongue.

4. A cable support according to claim 1, wherein the rail is provided with an L-shaped cross section.

5. A cable support according to claim 4, wherein the fingers are transverse to the longitudinal direction of the rail.

6. A cable support according to claim 1, wherein the rail is adapted to cooperate with an edge portion of a subrack to form a substantially closed section cable cannel.

7. A cable support according to claim 1, wherein the cable support is used in a structure for accommodating printed circuit boards on a subrack.

8. A cable support for use in a structure for accommodating electronic equipment said support comprising an elongate rail with cable guiding surfaces for guiding a cable along said structure, at least one pair of curved fingers arranged with mutual interval at an angle to the longitudinal axis of said rail, and a tongue which is located in the intervals between two adjacent fingers, wherein the rail is provided with an L-shaped cross section, the fingers are transverse to the longitudinal direction of the rail, and wherein the fingers are provided with tips that are bent away from the longitudinal axis of the fingers.

9. A cable support according to claim 8, wherein the L-shaped rail is complemented by the fingers and the tongues to form an U-shaped cable channel.

10. A cabled support according to claim 9, wherein the bottom of the U-shaped profile channel, along the line of fingers and tongues, is bent slightly in the direction of the opening of the U-shaped profile.

\* \* \* \* \*